United States Patent [19]

Nishikawa et al.

[11] Patent Number: 5,698,135

[45] Date of Patent: Dec. 16, 1997

[54] LIQUID CRYSTAL-ALIGNING AGENT

[75] Inventors: Michinori Nishikawa; Shigeo Kawamura; Yasuo Matsuki, all of Yokkaichi; Kyouyu Yasuda, Tsu; Tsuyoshi Miyamoto, Yokkaichi, all of Japan

[73] Assignee: Japan Synthetic Rubber Co., Ltd., a Japanese Corporation, Tokyo, Japan

[21] Appl. No.: 568,508

[22] Filed: Dec. 7, 1995

[51] Int. Cl.$^6$ .......................... C09K 19/56; C09K 19/52; C08G 69/36

[52] U.S. Cl. .................. 252/299.4; 252/299.01; 528/329.1; 528/353

[58] Field of Search .................. 252/299.01, 299.4; 528/329.1, 353

[56] References Cited

U.S. PATENT DOCUMENTS

| | | | |
|---|---|---|---|
| 4,366,304 | 12/1982 | Nimry et al. | 528/189 |
| 4,454,310 | 6/1984 | Oka et al. | 528/188 |
| 4,879,059 | 11/1989 | Hanyu et al. | 252/299.4 |
| 5,129,727 | 7/1992 | Hanyu et al. | 359/75 |
| 5,135,678 | 8/1992 | Murata et al. | 252/299.4 |
| 5,276,132 | 1/1994 | Nishikawa et al. | 528/353 |
| 5,478,682 | 12/1995 | Nishikawa et al. | 430/20 |
| 5,478,913 | 12/1995 | Boyce et al. | 528/353 |

FOREIGN PATENT DOCUMENTS

| | | |
|---|---|---|
| 0 259 761 | 3/1988 | European Pat. Off. . |
| 0 345 064 | 12/1989 | European Pat. Off. . |
| 0 365 855 | 5/1990 | European Pat. Off. . |
| 0 368 204 | 5/1990 | European Pat. Off. . |
| 1016832 | 1/1989 | Japan . |
| 1321915 | 12/1989 | Japan . |

*Primary Examiner*—C. H. Kelly
*Attorney, Agent, or Firm*—Oblon, Spivak, McClelland, Maier & Neustadt, P.C.

[57] ABSTRACT

A liquid crystal-aligning agent comprising at least one of a polyamic acid obtained by reacting (A) a tetracarboxylic acid dianhydride consisting of 70 to 98 mole % of a dianhydride of a tetracarboxylic acid such as

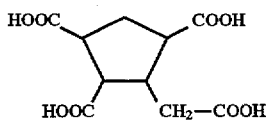

or the like, and 2 to 30 mole % of a dianhydride of a cyclobutanetetracarboxylic acid, and (B) a diamine compound, and a polymer obtained by imidizing the polyamic acid.

10 Claims, No Drawings

LIQUID CRYSTAL-ALIGNING AGENT

DETAILED DESCRIPTION OF THE INVENTION

The present invention relates to a liquid crystal-aligning agent used for the formation of a liquid crystal-aligning film of a liquid crystal display device. More specifically, the present invention relates to a liquid crystal-aligning agent which has good liquid crystal alignability, which can provide a liquid crystal display device of high voltage holding ratio, and which can form a liquid crystal-aligning film whose surface hardly undergoes scars (hereinafter referred to as "rubbing scars" in some cases) when subjected to a rubbing treatment.

TN liquid crystal display devices are known which have a TN (twisted nematic) liquid crystal cell having a sandwich structure comprising (1) two substrates each having, on the surface, a liquid crystal-aligning film via a transparent electroconductive film and (2) a nematic liquid crystal layer interposed between the two substrates, having positive dielectric anisotropy wherein the major axis of each liquid crystal molecule is twisted by 90° continuously in a direction extending from one of the substrates to the other substrate. The alignment of liquid crystal in liquid crystal display device such as TN liquid crystal display device or the like is achieved by a liquid crystal-aligning film provided with alignability for liquid crystal molecules by a rubbing treatment. As the material for liquid crystal-aligning film as a constituent of liquid crystal display device, resins such as polyimide, polyamide, polyester and the like are known. Polyimides, in particular, are in use in many liquid crystal display devices due to their excellency in heat resistance, compatibility with liquid crystal, mechanical strengths, etc.

When the TN liquid crystal display device or the like is produced using a liquid crystal-aligning film made of a known material such as polyimide or the like, however, the liquid crystal display device has problems in that it exhibit a low voltage holding ratio and insufficient contrast. Furthermore, the display device has also a problem in that when the liquid crystal-aligning film is subjected to a rubbing treatment, the film has scars on its surface, which invites poor display of the liquid display device. Hence, it has been desired to develop a liquid crystal-aligning agent capable of providing a liquid crystal display device which hardly suffers rubbing scars and which has excellent liquid crystal alignability and voltage holding ratio.

The first object of the present invention is to provide a liquid crystal-aligning agent capable of providing a liquid crystal display device which is reliably imparted with alignability for liquid crystal molecules by a rubbing treatment and which has excellent liquid crystal alignability.

The second object of the present invention is to provide a liquid crystal-aligning agent capable of providing a liquid crystal display device of high voltage holding ratio.

The third object of the present invention is to provide a liquid crystal-aligning agent capable of forming a coating film which almost free from rubbing scars.

The further objects and advantages of the present invention will become apparent from the following description.

The above objects and advantages are achieved according to the present invention by a liquid crystal-aligning agent comprising at least one of:

a polyamic acid (hereinafter referred to as "polymer I") obtained by reacting (A) a tetracarboxylic acid dianhydride consisting of 70 to 98 mole % of (A-1) a dianhydride of a tetracarboxylic acid selected from the group consisting of the compounds represented by the following formula (1) to (7):

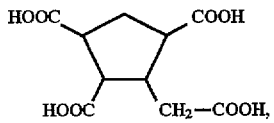
(1)

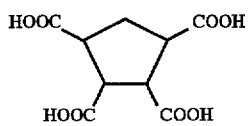
(2)

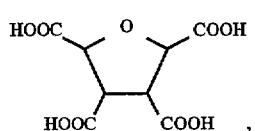
(3)

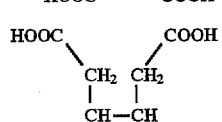
(4)

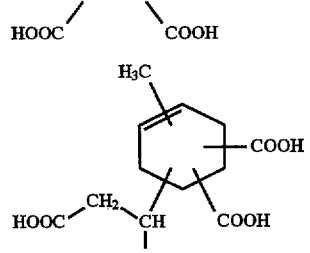
(5)

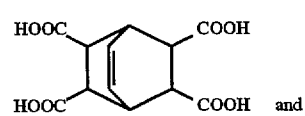
(6) and

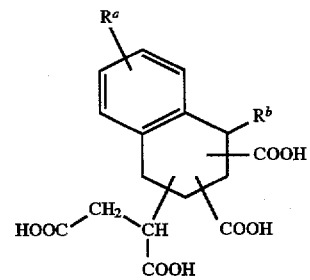
(7)

wherein $R^a$ and $R^b$ in the formula (7) are each independently a hydrogen atom, a methyl group or an ethyl group, and 2 to 30 mole % of (A-2) a dianhydride of a cyclobutane-tetracarboxylic acid represented by the following formula (8):

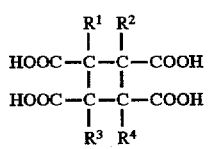
(8)

wherein $R^1$ to $R^4$ are each independently a hydrogen atom, a halogen atom or an alkyl group of 1 to 3 carbon atoms, and (B) a diamine compound represented by the following formula (9):

$$H_2N-R^5-NH_2 \quad (9)$$

wherein $R^5$ is a divalent organic group, and a polymer (hereinafter referred to as "polymer II") obtained by imidizing the polymer I.

The present invention is hereinafter described in detail.

The liquid crystal-aligning agent of the present invention comprises a polymer I obtained by reacting (A) a tetracarboxylic acid dianhydride consisting of (A-1) and (A-2), with (B) a diamine compound, and/or a polymer II.

<Tetracarboxylic acid dianhydride (A)>

<Compound (A-i)>

The compound (A-1) used in the present invention includes dianhydrides of tetracarboxylic acids represented by the formulas (1) to (7). They can be used alone or in combination of two or more of them.

By using the compound (A-1), a liquid crystal-aligning agent can be obtained which can provide a liquid crystal display device of high voltage holding ratio.

Examples of the compound (A-1) are tetracarboxylic acid dianhydrides such as 2,3,5-tricarboxycyclopentylacetic acid dianhydride, 1,2,3,4-cyclopentanetetracarboxylic acid dianhydride, 2,3,4,5-tetrahydrofurantetracarboxylic acid dianhydride, butanetetracarboxylic acid dianhydride, 5-(2, 5-dioxotetrahydrofural)-3-methyl-3-cyclohexene-1,2-dicarboxylic acid dianhydride, bicyclo[2.2.2]-octo-7-ene-2, 3,5,6-tetracarboxylic acid dianhydride, 1,3,3a,4,5,9b-hexahydro-5-(tetrahydro-2,5-dioxo-3-furanyl)-naphtho[1,2-c]furan-1,3-dione, 1,3,3a,4,5,9b-hexahydro-5-methyl-5-(tetrahydro-2,5-dioxo-3-furanyl)-naphtho[1,2-c]-furan-1,3-dione, 1,3,3a,4,5,9b-hexahydro-5-ethyl-5-(tetrahydro-2,5-dioxo-3-furanyl)-naphtho[1,2-c]-furan-1,3-dione, 1,3,3a,4,5,9b-hexahydro-7-methyl-5-(tetrahydro-2,5-dioxo-3-uranyl)-naphtho[1,2-c]-furan-1,3-dione, 1,3,3a,4,5,9b-hexahydro-7-ethyl-5-(tetrahydro-2,5-dioxo-3-furanyl)-naphtho[1,2-c]-furan-1,3-dione, 1,3,3a,4,5,9b-hexahydro-8-methyl-5-(tetrahydro-2,5-dioxo-3-furanyl)-naphtho[1,2-c]-furan-1,3-dione, 1,3,3a,4,5,9b-hexahydro-8-ethyl-5-(tetrahydro-2,5-dioxo-3-furanyl)-naphtho[1,2-c]-furan-1,3-dione and 1,3,3a,4,5,9b-hexahydro-5,8-dimethyl-5-(tetrahydro-2,5-dioxo-3-furanyl)-naphtho[1,2-c]-furan-1,3-dione.

Of these, particularly preferable are 2,3,5-tricarboxycyclopentylacetic acid dianhydride, butanetetracarboxylic acid dianhydride, 1,3,3a,4,8,9b-hexahydro-5-(tetrahydro-2,5-dioxo-3-furanyl)-naphtho-[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione1, 1,3,3a,4, 5,9b-hexahydro-5-ethyl-5-(tetrahydro-2,5-dioxo-3-furanyl)-naphtho[1,2-c]-furan- 1,3-dione, 1,3,3a,4,5,9b-hexahydro-7-methyl-5-(tetrahydro-2,5-dioxo-3-furanyl)-naphtho[1,2-c]-furan-1,3-dione, 1,3,3a,4,5,9b-hexahydro-7-ethyl-5-(tetrahydro-2,5-dioxo-3-furanyl)-naphtho[1,2-c]-furan-1,3-dione, 1,3,3a,4,5,9b-hexahydro-8-methyl-5-(tetrahydro-2,5-dioxo-3-furanyl)-naphtho[1,2-c]-furan-1,3-dione, 1,3,3a,4, 5,9b-hexahydro-8-ethyl-5-(tetrahydro-2,5-dioxo-3-furanyl)-naphtho[1,2-c]-furan-1,3-dione and 1,3,3a,4,5,9b-hexahydro-5,8-dimethyl-5-(tetrahydro-2,5-dioxo-3-furanyl)-naphtho[1,2-c]-furan-1,3-dione because the liquid crystal-aligning agent produced therefrom has excellent storage stability.

The proportion of the compound (A-1) used is 70 to 98 mole %, preferably 80 to 98 mole %, based on the total moles of the total tetracarboxylic acid dianhydrides. When the proportion is more than 98 mole %, the effect of reducing rubbing scars is low, while when the proportion is less than 70 mole %, the resulting aligning agent has inferior storage stability. When the proportion is 80 mole % or more, the resulting aligning agent can be stored over a long period and has excellent storage stability.

<Compound (A-2)>

The compound (A-2) used in the present invention is a dianhydride of a cyclobutane ring-containing tetracarboxylic acid. By using the compound, a liquid crystal-aligning agent can be obtained which hardly suffers rubbing scars. This is presumed because the compound (A-2) has a stiff cyclobutane structure as the skeleton.

Examples of the compound (A-2) include 1,2,3,4-cyclobutanetetracarboxylic acid dianhydride, 1,3-dimethyl-1,2,3,4-cyclobutanetetracarboxylic acid dianhydride, 1,2,3, 4-tetramethyl-1,2,3,4-cyclobutanetetracarboxylic acid dianhydride, 1,3-diethyl-1,2,3,4-cyclobutanetetracarboxylic acid dianhydride, 1,2,3,4-tetraethyl- 1,2,3,4-cyclobutanetetracarboxylic acid dianhydride, 1,2,3,4-tetrachloro-1,2,3,4-cyclobutanetetracarboxylic acid dianhydride and 1,2,3,4-tetrafluoro-1,2,3,4-cyclobutanetetracarboxylic acid dianhydride. These compounds can be used alone or in combination of two or more of them.

Of them, 1,2,3,4-cyclobutanetetracarboxylic acid dianhydride and 1,3-dimethyl-1,2,3,4-cyclobutanetetracarboxylic acid dianhydride are particularly preferable because the resulting liquid crystal-aligning agent can form a liquid crystal-aligning film having good liquid crystal alignability over a long period.

The proportion of the compound (A-2) used is 2 to 30 mole %, preferably 2 to 20 mole %, based on the total moles of the total tetracarboxylic acid dianhydrides. When the proportion is less than 2 mole %, the effect of reducing rubbing scars is low. When the proportion is more than 30 mole %, the resulting aligning agent has inferior storage stability. When the proportion is less than 20 mole %, the resulting aligning agent can be stored over a long period and has excellent storage stability.

<Diamine compound (B)>

The diamine compound used in the present invention is represented by the formula (9).

The $R^5$ of the formula (9), which is a divalent organic group, can be exemplified by an aliphatic group, an aromatic group and an alicyclic group. The carbon atoms of $R^5$ are preferably 2 to 30.

Specific examples of the diamine compound (B) include aromatic diamines such as 1,4-phenylenediamine, 1,3-phenylenediamine, 4,4'-diaminodiphenylmethane, 4,4'-diaminodiphenylethane, 4,4'-diaminodiphenyl sulfide, 4,4'-diaminodiphenyl sulfone, 4,4'-diaminodiphenyl ether, 1,5-diaminonaphthalene, 3,3'-dimethyl- 4,4'-diaminobiphenyl, 4,4'-diaminobenzanilide, 3,4'-diaminodiphenyl ether, 3,3'-diaminobenzophenone, 3,4'-diaminobenzophenone, 4,4'-diaminobenzophenone, 2,2-bis[4-(4-aminophenoxy)phenyl] propane, 2,2-bis[4-(4-aminophenoxy)phenyl] hexafluoropropane, 2,2-bis(4-amino-phenyl) hexafluoropropane, bis[4-(4-aminophenoxy)-phenyl] sulfone, 1,4-bis(4-aminophenoxy)benzene, 4,4'-(p-phenylenediisopropylidene)bisaniline, 4,4'-(m-phenylenediisopropylidene)bisaniline, 1,3-bis(4-aminophenoxy)benzene, 1,3-bis(3-aminophenoxy)benzene, 9,9-bis(4-aminophenyl)-10-hydroanthracene, 9,9-bis(4-aminophenyl)fluorene, 4,4'-methylene-bis(2-chloroaniline), 2,2',5,5'-tetrachloro-4,4'-diaminobiphenyl, 2,2'-dichloro-4, 4'-diamino-5,5'-dimethoxybiphenyl, 3,3'-dimethoxy-4,4'-diaminobiphenyl and the like; hereto atom-containing aromatic diamines such as diaminotetraphenylthiophene and the like; aliphatic or alicyclic diamines such as 1,1-metaxylylenediamine, 1,2-ethylenediamine, 1,3-propanediamine, tetramethylenediamine, pentamethylenediamine, hexamethylenediamlne, heptamethylenediamine, octamethylenediamine, nonamethylenediamine, 1,4-diaminocyclohexane, isophoronediamine, tetrahydrodichloropentadienylenediamine, hexahydro-4,7-methanoindanylenedimethylenediamine, tricyclo[6.2.1.0$^{2.7}$]-undecylenedimethyldiamine, 4,4'-methylenebis(cyclohexylamine) and the like; and diaminoorganosiloxanes represented by the following formula (A), etc.:

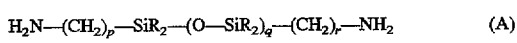

wherein R is a $C_{1-12}$ hydrocarbon group such as alkyl group (e.g. methyl, ethyl or propyl), cycloalkyl group (e.g. cyclohexyl) or aryl group (e.g. phenyl); p is an integer of 1 to 3; q is an integer of 1 to 20; and r is an integer of 1 to 3. They can be used alone or in combination of two or more of them. As these diamine compounds, commercially available products may be used as they are, or after being re-reduced.

Of the above compounds, particularly preferable are 1,4-phenylenediamine, 4,4'-diaminodiphenylmethane, 4,4'-diaminodiphenyl ether, 2,2-bis[4-(4-aminophenoxy)phenyl] propane, 9,9-bis(4-aminophenyl)fluorene, 2,2-bis[4-(4-aminophenoxy)phenyl]hexafluoropropane, 2,2-bis(4-aminophenyl)hexafluoropropane, 4,4'-(1,4-phenylenediisopropylidene)bisaniline and 4,4'-(1,3-phenylenediisopropylidene)bisaniline, because the resulting liquid crystal-aligning agent can form a liquid crystal-aligning film having good liquid crystal alienability over a long period.

When three or more diamine compounds are used in combination, the following combination is particularly preferable because the liquid crystal-aligning agent prepared using the combination can form a liquid crystal-aligning film which has excellent liquid crystal alignability and a high voltage holding ratio, which hardly suffers rubbing scars, which is superior in image sticking property and long-term reliability, and which has a high pretilt angle.

A combination of a phenylenediamine compound (B-1) represented by the following formula (10):

wherein $R^6$ is a halogen atom, an alkyl group or an alkoxyl group; and a is an integer of 0 to 4, a diamine compound (B-2) represented by the following formula (11):

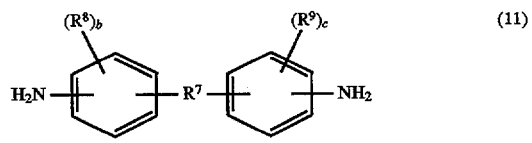

wherein $R^7$ is —CH$_2$—, —O—, —S—, a group represented by the following formula (i):

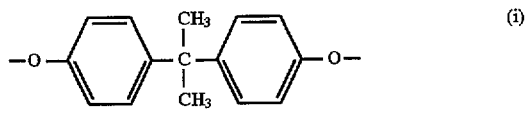

or a group represented by the following formula (ii):

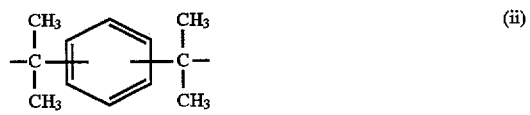

$R^8$ and $R^9$ are each independently a halogen atom or an alkyl group; and b and c are each independently an integer of 0 to 4, and a diamine compound (B-3) having a steroidal skeleton, represented by the following formula (12):

wherein $R^{10}$ is a divalent organic group having a steroidal skeleton.

Description is made on the compounds (B-1), (B-2) and (B-3).

<Compound (B-1)>

The compound (B-1) is a phenylenediamine compound represented by the formula (10). By using this compound, a liquid crystal-aligning agent having an excellent image sticking property can be obtained.

In the formula (10) representing the compound (B-1), the halogen atom includes, for example, a fluorine atom, a chlorine atom and a bromine atom. The alkyl group is preferably a straight-chain or branched-chain alkyl group having 1 to 4 carbon atoms. The alkoxyl group is preferably a straight-chain or branched-chain alkoxyl group having i to 4 carbon atoms.

Specific examples of the compound (B-1) include 1,2-phenylenediamine, 3-methyl-1,2-phenylenediamine, 4-methyl-1,2-phenylenediamine, 4,5-dimethyl-1,2-phenylenediamine, 8-ethyl-1,2-phenylenediamine, 3-methyl-1,2-phenylenediamine, 4-ethyl-1,2-phenylenediamine, 4,5-diethyl-1,2-phenylenediamine, 3-methoxy-1,2-phenylenediamine, 4-methoxy-1,2-phenylenediamine, 4,5-dimethoxy-1,2-phenylenediamine, 3-ethoxy-1,2-phenylenediamine, 4-ethoxy-1,2-phenylenediamine, 3-chloro-1,2-phenylenediamine, 4-chloro-1,2-phenylenediamine, 3-fluoro-1,2-phenylenediamine, 4-fluoro-1,2-phenylenediamine, 1,3-phenylenediamine, 2-methyl-1,3-phenylenediamine, 4-methyl-1,3-phenylenediamine, 5-methyl-1,3-phenylenediamine, 2-ethyl-1,3-phenylenediamine, 4-ethyl-1,3-phenylenediamine, 5-ethyl-1,3-phenylenediamine, 2-methoxy-1,5-phenylenediamine, 4-methoxy-1,3-phenylenediamine, 5-methoxy-1,3-phenylenediamine, 4-ethoxy-1,3-phenylenediamine, 5-ethoxy-1,3-phenylenediamine, 4-chloro-1,3-phenylenediamine, 5-chloro-1,3-phenylenediamine, 4-fluoro-1,3-phenylenediamine, 5-fluoro-1,3-phenylenediamine, 1,4-phenylenediamine, 2-methyl-1,4-phenylenediamine, 2,3-dimethyl-1,4-phenylenediamine, 2,5-dimethyl-1,4-phenylenediamine, 2,6-dimethyl-1,4-phenylenediamine, 2,3-diethyl-1,4-phenylenediamine, 2,5-diethyl-1,4-phenylenediamine, 2,6-diethyl-1,4-phenylenediamine, 2-methoxy-1,4-phenylenediamine, 2-ethoxy-1,4-phenylenediamine, 2-chloro-1,4-phenylenediamine, 2,3-dichloro-1,4-phenylenediamine, 2,5-dichloro-1,4-phenylenediamine, 2,6-dichloro-1,4-phenylenediamine, 2-fluoro-1,4-phenylenediamine, 2,3-difluoro-1,4-phenylenediamine, 2,5-difluoro-1,4-phenylenediamine and 2,6-difluoro-1,4-phenylenediamine. Of these, preferable are 1,2-phenylenediamine, 1,3-phenylenediamine, 1,4-phenylenediamine, 2-methyl-1,4-phenylenediamine, 2-ethyl-1,4-phenylenediamine, 2-methoxy-1,4-phenylenediamine, 2-ethoxy-1,4-phenylenediamine, 2-chloro-1,4-phenylenediamine and 2-fluoro-1,4-phenylenediamine, with 1,3-phenylenediamine and 1,4-phenylenediamine being particularly preferable. These compounds can be used alone or in combination of two or more of them.

<Compound (B-2)>

The compound (B-2) is a diamine compound represented by the formula (11). By using this compound, a liquid crystal-aligning agent can be obtained which gives a liquid crystal display device having high reliability.

In the formula (11) representing the compound (B-2), the halogen atom and the alkyl group include the same atoms and groups as mentioned with respect to the formula (10).

Specific examples of the compound (B-2) include 4,4'-diaminodiphenylmethane, 3,4'-diaminodiphenylmethane, 3,3'-diaminodiphenylmethane, 3,3'-dimethyl-4,4'-diaminodiphenylmethane, 4,4'-diaminodiphenyl ether, 3,4'-diaminodiphenyl ether, 3,3'-diaminodiphenyl ether, 3,3'-dimethyl-4,4'-diaminodiphenyl ether, 4,4'-diaminodiphenyl sulfide, 3,4'-diaminodiphenyl sulfide, 3,4'-diaminodiphenyl sulfide, 3,3'-dimethyl-4,4'-diaminodiphenyl sulfide, 2,2-bis[4-(4-aminophenoxy)phenyl]propane, 2,2-bis[4-(3-aminophenoxy)phenyl]propane, 4,4'-(1,4-phenylenediisopropylidene)bisaniline and 4,4'-(1,3-phenylenediisopropylidene)bisaniline. Of these, preferable are 4,4'-diaminodiphenylmethane, 4,4'-diaminodiphenyl ether, 4,4'-diaminodiphenyl sulfide, 2,2-bis[4-(4-aminophenoxy)phenyl]propane and 4,4'-(1,4-phenylenediisopropylidene)bisaniline, with 4,4'-diaminodiphenylmethane and 4,4'-diaminodiphenyl ether being particularly preferable. These compounds can be used alone or in combination of two or more of them.

<Compound (B-3)>

The compound (B-3) is a diamine compound having a steroidal skeleton, represented by the formula (12), By using this compound, a liquid crystal-aligning agent showing a high pretilt angle can be obtained.

Preferable examples of the compound (B-3) are a compound represented by the following formula (13)

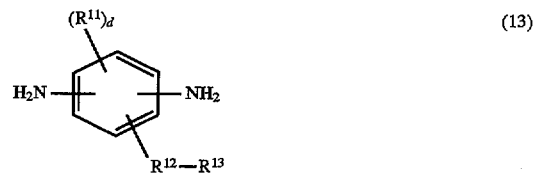

wherein $R^{11}$ is a halogen atom or an alkyl group;

$R^{12}$ is a divalent organic group; $R^{13}$ is a monovalent organic group having a steroidal skeleton; and d is an integer of 0 to 3), and a compound represented by the following formula (14)

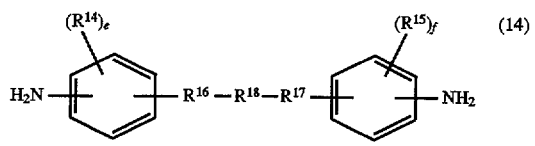

wherein $R^{14}$ and $R^{15}$ are each independently a halogen atom or an alkyl group; $R^{16}$ and $R^{17}$ are each independently a divalent organic group; $R^{16}$ is a divalent organic group having a steroidal skeleton; and e and f are each independently an integer of 0 to 4).

Preferable specific examples of the compounds represented by the formulas (13) and (14) are compounds represented by the following formulas (15) to (21).

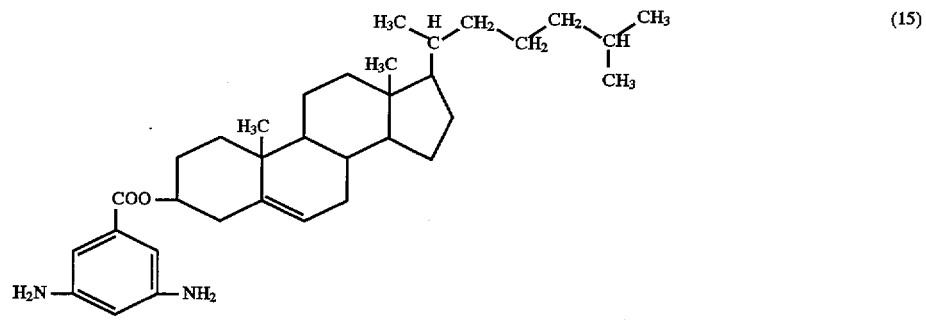

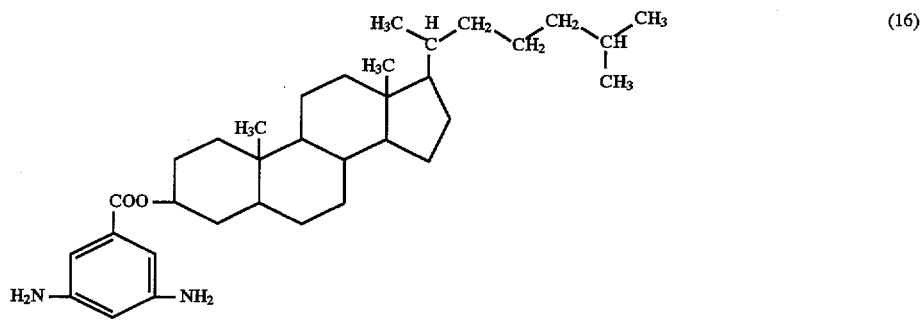

-continued
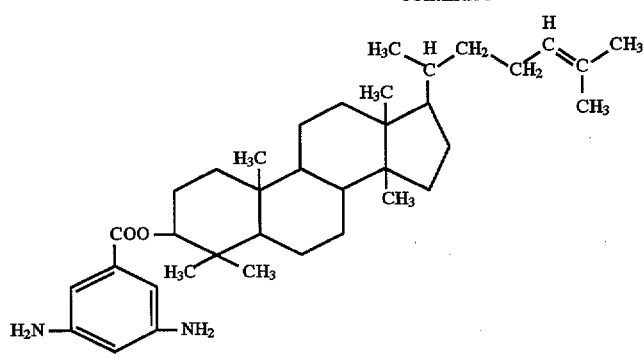
(17)
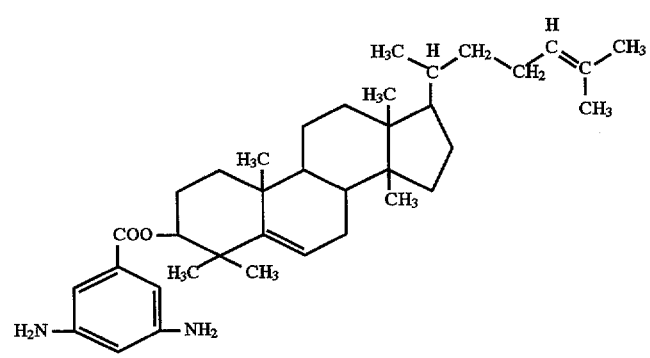
(18)
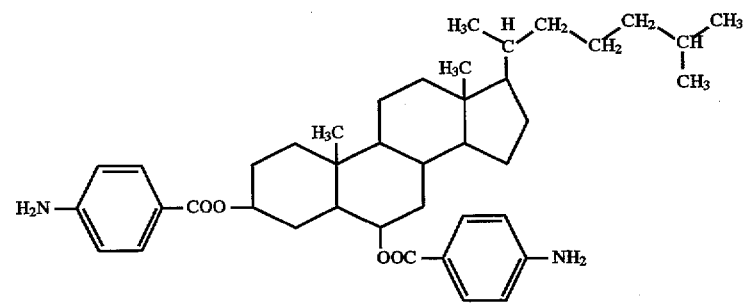
(19)
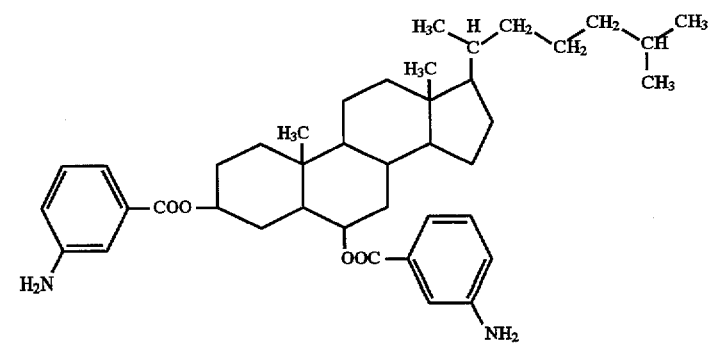
(20)

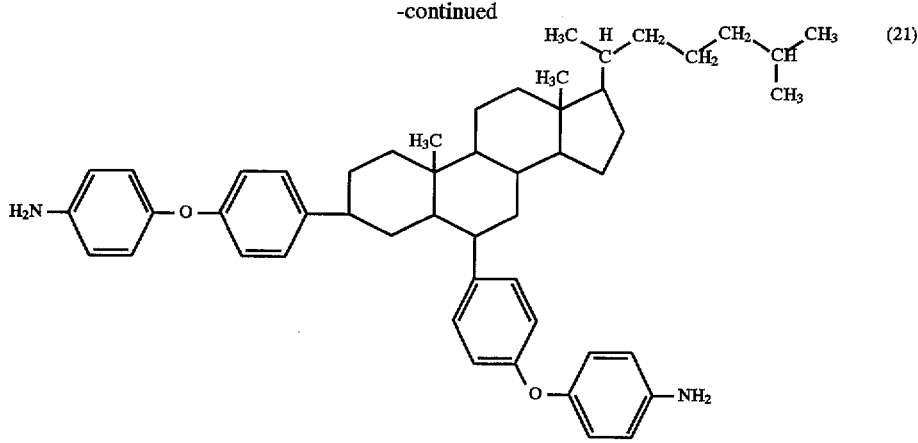

Of these, the compounds represented by the formulas (15), (18), (19) and (21) are particularly preferable. These compounds can be used alone or in combination of two or more of them.

In the present invention, when a combination of the compounds (B-1), (B-2) and (B-3) is used as the diamine compound (B), the proportions of the individual diamines in the total diamine compounds of the polymer I and/or the polymer II are:

- the compound (B-1): preferably 10 to 70 mole %, more preferably 10 to 50 mole %,
- the compound (B-2): preferably 30 to 80 mole %, more preferably 40 to 80 mole %, and
- the compound (B-3): preferably 1 to 25 mole %, more preferably 3 to 20 mole %.

When the proportion of the compound (B-1) is less than 10 mole %, the resulting liquid crystal display device is low in improvement of image sticking property, while when the proportion is more than 70 mole %, the resulting liquid crystal display device has reduced reliability in some cases. When the proportion of the compound (B-2) is less than 30 mole %, the resulting liquid crystal display device has reduced reliability in some cases, while when the proportion is more than 80 mole %, a high pretilt angle is difficult to obtain. When the proportion of the compound (B-3) is less than 1 mole %, a high pretilt angle is difficult to obtain, while when the proportion is more than 25 mole %, the resulting polymer tends to have reduced solubility in solvent.

<Proportions of reaction materials>

The proportions of the tetracarboxylic acid dianhydride (A) and the diamine compound (B) used in the synthesis of the polymer I are such that the amount of the acid anhydride group contained in the tetracarboxylic acid dianhydride is preferably 0.2 to 2 equivalents, more preferably 0.3 to 1.4 equivalents per equivalent of the amino group contained in the diamine compound. When the amount of the acid anhydride group contained in the tetracarboxylic acid dianhydride is less than 0.2 equivalent or more than 2 equivalents, the resulting polymer I has too low a molecular weight and gives a liquid crystal-aligning agent of inferior coating properties.

<Synthesis of polymer I>

The polymer I constituting the liquid crystal-aligning agent of the present invention is synthesized by the reaction of the tetracarboxylic acid dianhydride (A) and the diamine compound (B). The synthesis reaction of the polymer I is conducted in an organic solvent generally at 0° to 150° C., preferably at 0° to 100° C. When the reaction temperature is below 0° C., the solubility of the compounds in the solvent is inferior, while when the temperature is above 150° C., the resulting polymer has a low molecular weight. There is no particular restriction as to the organic solvent used in the synthesis of the polymer I, so long as the solvent is capable of dissolving the tetracarboxylic acid dianhydride, the diamine and the polymer I formed by the reaction of the two compounds. The solvent includes, for example, aprotic solvents such as γ-butyrolactone, N-methyl-2-pyrrolidone, N,N-dimethylformamide, N,N-dimethylacetamide, dimethyl sulfoxide, tetramethylurea, hexamethylphosphoric triamide and the like; and phenol type solvents such as m-cresol, xylenol, phenol, halogenated phenols and the like.

The amount (a) of the organic solvent used is preferably such that the total amount (b) of the reaction materials, i.e. the tetracarboxylic acid dianhydride and the diamine compound, becomes 0.1 to 30% by weight based on the total amount (a+b) of the organic solvent and the reaction materials.

The organic solvent can be used in combination with a poor solvent for the polymer I, such as alcohol, ketone, ester, ether, halogenated hydrocarbon, hydrocarbon or the like so long as the addition of the poor solvent does not precipitate the polymer I formed. Specific examples of the poor solvent include methyl alcohol, ethyl alcohol, isopropyl alcohol, cyclohexanol, ethylene glycol, propylene glycol, 1,4-butanediol, triethylene glycol, ethylene glycol monomethyl ether, acetone, methyl ethyl ketone, methyl isobutyl ketone, cyclohexanone, methyl acetate, ethyl acetate, butyl acetate, diethyl oxalate, diethyl malonate, dimethyl ether, ethylene glycol ethyl ether, ethylene glycol n-propyl ether, ethylene glycol isopropyl ether, ethylene glycol n-butyl ether, ethylene glycol n-hexyl ether, ethylene glycol dimethyl ether, ethylene glycol ethyl ether acetate, diethylene glycol dimethyl ether, diethylene glycol diethyl ether, diethylene glycol monomethyl ether, diethylene glycol monoethyl ether, diethylene glycol monobutyl ether, diethylene glycol monomethyl ether acetate, diethylene glycol monoethyl ether acetate, ethylene glycol methyl ether acetate, ethylene glycol n-propyl ether acetate, ethylene glycol isopropyl ether acetate, ethylene glycol n-butyl ether acetate, ethylene glycol n-hexyl ether acetate, 4-hydroxy-4-methyl-2-pentanone, ethyl 2-hydroxypropionate, ethyl 2-hydroxy-2-methylpropionate, methyl 2-hydroxy-2-methylpropionate, ethyl ethoxyacetate, ethyl hydroxyacetate, methyl 2-hydroxy-3-methylbutanoate, methyl 3-methoxypropionate, ethyl 3-methoxypropionate, ethyl 3-ethoxypropionate, methyl 3-ethoxypropionate, tetrahydrofuran, dichloromethane, 1,2-dichloroethane, 1,4- dichlorobutane, trichloroethane, chlorobenzene, o-dichlorobenzene, hexane, heptane, octane, benzene, toluene and xylene.

By the above synthesis reaction can be obtained a polymer solution containing the polymer I. The polymer solution is poured into a large amount of a poor solvent to form a precipitate. The precipitate is collected and dried under reduced pressure, whereby the polymer I can be obtained. By conducting, at least once, a procedure of redissolving the polymer I in an organic solvent and reprecipitating the polymer I with a poor solvent, the polymer I can be purified.

<Polymer II>

The polymer II constituting the liquid crystal-aligning agent of the present invention is a polymer obtained by subjecting the polymer I (which is a polyamic acid) to an imidization reaction.

The imidization reaction is conducted by heating the polymer I, or by dissolving the polymer I in an organic solvent, adding thereto a dehydrating agent and an imidization catalyst and, as necessary, heating the resulting mixture.

The reaction temperature in the method of heating the polymer I is generally 60° to 200° C., preferably 100° to 170° C. When the reaction temperature is below 60° C., the imidization reaction does not proceed sufficiently, and when the reaction temperature is above 200° C., the resulting polymer II has a low molecular weight in some cases.

Meanwhile, in the method of adding a dehydrating agent and an imidization catalyst to a polymer I solution, there can be used, as the dehydrating agent, an acid anhydride such as acetic anhydride, propionic anhydride, trifluoroacetic anhydride or the like. The amount of the dehydrating agent used is preferably 1.6 to 20 moles per mole of the recurring unit of the polymer I. As the imidization catalyst, there can be used a tertiary amine such as pyridine, collidine, lutidine, triethylamine or the like; however, the imidization catalyst is not restricted to these. The amount of the imidization catalyst used is preferably 0.5 to 10 moles per mole of the dehydrating agent used. The organic solvent used in the imidization reaction can be the same as mentioned with respect to the synthesis of the polymer I. The temperature of the imidization reaction is generally 0° to 180° C., preferably 60° to 150° C. By subjecting the thus obtained polymer solution to the same purification as done for the polymer I, the polymer II can be purified.

<Intrinsic viscosity of polymer>

The thus obtained polymers I and II each have an intrinsic viscosity (measured at 30° C. in N-methyl-2-pyrrolidone; the same applies hereinafter) of generally 0.05 to 10 dl/g, preferably 0.05 to 5 dl/g.

<Liquid crystal-aligning agent>

The liquid crystal-aligning agent of the present invention is a solution of the polymer I and/or the polymer II in an organic solvent, and is used as such a solution.

As the organic solvent constituting the liquid crystal-aligning agent of the present invention, there can be cited the same solvent as mentioned with respect to the synthesis reaction and imidization reaction of the polymer I. The poor solvent cited with respect to the synthesis of the polymer I can be used in combination with the organic solvent, by appropriate selection.

The polymer concentration (total concentration of polymer I and polymer II) in the liquid crystal-aligning agent of the present invention is determined in view of the viscosity, volatility, influence on environment, etc. of the aligning agent, while is preferably 1 to 10% by weight.

The liquid crystal-aligning agent (solution) containing the polymer I and/or the polymer II is coated on a substrate by a printing method, a spin-coating method or the like and then dried, whereby a film that becomes a liquid crystal-aligning film is formed. When the polymer concentration in the aligning agent is less than 1% by weight, the resulting film has too small a thickness and no satisfactory liquid crystal-aligning film can be obtained. On the other hand, when the polymer concentration is more than 10% by weight, the film has too large a thickness, no satisfactory liquid crystal-aligning film can be obtained, and the aligning agent has too high a viscosity and consequently, has inferior coating properties.

The polymer I and/or the polymer II constituting the present liquid crystal-aligning agent may each be a terminal-modified polymer. This terminal-modified polymer has a controlled molecular weight and, without reducing the meritorious effects of the present invention, can improve the coatability, etc. of the resulting liquid crystal-aligning agent. The terminal-modified polymer can be synthesized by, in the synthesis of the polymer I, adding an acid anhydride or a monoamine compound to the reaction system.

The acid anhydride added to the reaction system for polymer I synthesis in order to obtain a terminal-modified polymer includes, for example, maleic anhydride, phthalic anhydride, iraconic anhydride, n-decylsuccinic anhydride, n-dodecylsuccinic anhydride, n-tetradecylsuccinic anhydride and n-hexadecylsuccinic anhydride. The monoamine added to the reaction system includes, for example, aniline, cyclohexylamine, n-butylamine, n-pentylamine, n-hexylamine, n-heptylamine, n-octylamine, n-nonylamine, n-decylamine, n-undecylamine, n-dodecylamine, n-tridecylamine, n-tetradecylamine, n-pentadecylamine, n-hexadecylamine, n-heptadecylamine, n-octadecylamine and n-eicosylamine.

The liquid crystal-aligning agent of the present invention comprises the polymer I and/or the polymer II. The agent may further comprise a functional silane-containing compound with the view to improve the adhesivity to the substrate.

The functional silane-containing compound includes, for example, 3-aminopropyltrimethoxysilane, 3-aminopropyltriethoxysilane, 2-aminopropyltrimethoxysilane, 2-aminopropyltriethoxysilane, N-(2-aminoethyl)-3-aminopropyltrimethoxysilane, N-(2-aminoethyl)-3-aminopropylmethyldimethoxysilane, 3-ureidopropyltrimethoxysilane, 3-ureidopropyltriethoxysilane, N-ethoxycarbonyl-3-aminopropyltrimethoxysilane, N-ethoxycarbonyl-3-aminopropyltriethoxysilane, N-triethoxysilylpropyltriethylenetriamine, N-trimethoxysilylpropyltriethylenetriamine, 10-trimethoxysilyl-1,4,7-triazadecane, 10-triethoxysilyl-1,4,7-triazadecane, 9-trimethoxysilyl-3,6-diazanonyl acetate, 9-triethoxysilyl-3,6-diazanonyl acetate, N-benzyl-3-aminopropyltrimethoxysilane, N-benzyl-3-aminopropyltriethoxysilane, N-phenyl-3-aminopropyltrimethoxysilane, N-phenyl-3-aminopropyltriethoxysllane, N-bis(oxyethylene)-3-aminopropyltrimethoxysilane and N-bis(oxyethylene)-3-aminopropyltriethoxysllane. The present aligning agent may furthermore contain, for example, a reaction product between tetracarboxylic acid dianhydride and amino group-containing silane compound, described in Japanese Patent Application Kokai (Laid-Open) No. 291922/1988.

<Production of liquid crystal display device>

The liquid crystal display device obtained by using the present liquid crystal-aligning agent can be produced, for example, by the following process.

(1) The present liquid crystal-aligning agent is coated on the side of a substrate provided with a transparent electroconductive film by a printing method or the like and then the coated side of the substrate is heated thereby to form a coating film. As the substrate, there can be used a transparent substrate made of, for example, a glass (e.g. float glass or soda-lime glass) or a plastic (e.g. polyethylene terephthalate, polybutylene terephthalate, polyethersulfone or polycarbonate). As the transparent electroconductive film provided with one side of the substrate, there can be used, for example, a NESA film (a registered trade name of PPG Co. of U.S.A.) made of tin oxide ($SnO_2$) or an ITO film made of indium oxide-tin oxide ($In_2O_3$-$SnO_2$). The patterning of the transparent electroconductive film is conducted by a photo-etching method, a method using a mask, or the like. The coating of the liquid crystal-aligning agent can be conducted not only by the above-mentioned printing method but also by a roll coater method, a spinner coating method or the like.

In coating the liquid crystal-aligning agent, a functional silane-containing compound, a functional titanium-containing compound or the like may be coated beforehand on one side of the substrate and the transparent electroconductive film in order to improve the adhesion of the film of the coated aligning agent to the substrate and the transparent electroconductive film. The temperature for heating the film of the coated aligning agent is 80° to 200° C., preferably 120° to 200° C. The thickness of the film formed is generally 0.001 to 1 μm, preferably 0.005 to 0.5 μm.

(2) The surface of the film formed is subjected to a rubbing treatment in which the surface is rubbed with, for example, a roll covered with a cloth made of a nylon, rayon or cotton fiber, in a given direction, whereby the film is provided with an alignability for liquid crystal molecules and becomes a liquid crystal-aligning film.

(3) According to the procedure as mentioned above, two substrates each having a liquid crystal-aligning film formed thereon are prepared. The two substrates are placed in parallel via a gap (a cell gap) such that the liquid crystal-aligning films face each other and that the rubbing directions of the two films become perpendicular to each other, or parallel but opposite. The peripheries of the two substrates are laminated with a sealing agent. A liquid crystal is charged into the cell gap between the substrates from a liquid crystal filling hole. The filling hole is sealed to constitute a liquid crystal cell. On the outer surface of the liquid crystal cell, i.e. the other sides of the substrates constituting the liquid crystal cell are laminated two polarizing plates such that the polarization direction of each polarizer coincides with or becomes perpendicular to the rubbing direction of the liquid crystal-aligning film formed on one side of the substrate, whereby a liquid crystal display device is obtained.

As the sealing agent, there can be used, for example, an epoxy resin containing a curing agent and spherical aluminum oxide as spacer.

As liquid crystal materials, there can be mentioned a nematic liquid crystal and a smectic liquid crystal. A nematic liquid crystal is preferred and there can be used, for example, a Schiff's base liquid crystal, an azoxy liquid crystal, a biphenyl liquid crystal, a phenylcyclohexane liquid crystal, an ester liquid crystal, a terphenyl liquid crystal, a biphenylcyclohexane liquid crystal, a pyrimidine liquid crystal, a dioxane liquid crystal, a bicyclooctane liquid crystal, a cubane liquid crystal or the like. To the above liquid crystal may be added, for example, a cholesteric liquid crystal (e.g. cholesteryl chloride, cholesteryl nonanate or cholesteryl carbonate), or a chiral agent such as C-15 or CB-15 (both are trade names and products of Merck Co.). Further, a ferroelectric liquid crystal such as p-decyloxybenzilidene-p-amino-2-methylbutyl cinnamate or the like can be used as the liquid crystal.

As the polarizing plates laminated on the outer surface of the liquid crystal cell, there can be mentioned, for example, a polarizing plate comprising (1) a polarizing film (called a H film) obtained by allowing a polyvinyl alcohol to absorb iodine with the polyvinyl alcohol being stretched and (2) cellulose acetate protective films placed at the both sides of the polarizing film, and a polarizing plate which is a H film itself.

The present invention is hereinafter described more specifically by way of Examples. However, the present invention is not restricted to these Examples. The liquid crystal display devices produced in the following Examples and Comparative Examples were measured for (1) rubbing scars of liquid crystal-aligning film, (2) alignability of liquid crystal display device and (3) voltage holding ratio of liquid crystal display device, according to the following measurement methods.

[Rubbing scars of liquid crystal-aligning film]

A liquid crystal-aligning film was subjected to a rubbing treatment at the surface and then observed using an optical microscope (magnification: 100×) to examine the presence or absence of the rubbing scars of surface generated by the rubbing treatment.

[Alignability of liquid crystal display device]

The presence or absence of an abnormal domain in the liquid crystal cell at the time when the voltage was On or Off was examined by the use of a polarizing microscope. A case of no abnormal domain was rated as "good".

[Voltage holding ratio of liquid crystal display device]

A voltage of 5 V was applied to a liquid crystal display device placed in a thermostat of 80° C., and then the voltage was cut off. After 16.7 msec, the voltage holding ratio was measured. The tester used was VHR-1 manufactured by Toyo Technica K.K.

SYNTHESIS EXAMPLE 1

In 1,010 g of N-methyl-2-pyrrolidone were dissolved 40.3 g (0.18 mole) of 2,3,5-tricarboxycyclopentylacetic acid dianhydride, 3.9 g (0.02 mole) of 1,2,3,4-cyclobutanetetracarboxylic acid dianhydride and 21.6 g (0.20 mole) of 1,4-phenylenediamine. The solution was subjected to a reaction at room temperature for 6 hours. Then, the reaction mixture was poured into a large excess of methanol to precipitate a reaction product. Thereafter, the precipitate was washed with methanol and dried at 40° C. for 15 hours under reduced pressure to obtain 62.9 g of a polymer (I-1) having an intrinsic viscosity of 1.34 dl/g.

SYNTHESIS EXAMPLE 2

30.0 g of the polymer (I-1) obtained in Synthesis Example 1 was dissolved in 570 g of γ-butyrolactone. To the solution were added 21.6 g of pyridine and 16.74 g of acetic anhydride. The mixture was heated at 120° C. for 3 hours to conduct an imidization reaction. The reaction product was precipitated in the same manner as in Synthesis Example 1 to obtain 28.3 g of a polymer (II-1) having an intrinsic viscosity of 1.40 dl/g.

SYNTHESIS EXAMPLE 3

A polymer (I-2) was obtained in the same manner as in Synthesis Example 1 except that the amounts of 2,3,5- tricarboxycyclopentylacetic acid dianhydride and 1,2,3,4-cyclobutanetetracarboxylic acid dianhydride were changed to 42.6 g (0.19 mole) and 2.0 g (0.01 mole), respectively. The polymer (I-2) was subjected to the same imidization reaction as in Synthesis Example 2 to obtain 27.2 g of a polymer (II-2) having an intrinsic viscosity of 1.36 dl/g.

SYNTHESIS EXAMPLE 4

A polymer (I-3) was obtained in the same manner as in Synthesis Example 1 except that the amounts of 2,3,5-tricarboxycyclopentylacetic acid dianhydride and 1,2,3,4-cyclobutanetetracarboxylic acid dianhydride were changed to 35.8 g (0.16 mole) and 7.8 g (0.04 mole), respectively. The polymer (I-3) was subjected to the same imidization reaction as in Synthesis Example 2 to obtain 27.3 g of a polymer (II-3) having an intrinsic viscosity of 1.46 dl/g.

SYNTHESIS EXAMPLE 5

A polymer (I-4) was obtained in the same manner as in Synthesis Example 1 except that the diamine used in Synthesis Example 1 was changed to 39.6 g (0.20 mole) of 4,4'-diaminodiphenylmethane. The polymer (I-4) was subjected to the same imidization reaction as in Synthesis Example 2 to obtain 27.3 g of a polymer (II-4) having an intrinsic viscosity of 1.37 dl/g.

SYNTHESIS EXAMPLE 6

A polymer (I-5) was obtained in the same manner as in Synthesis Example 1 except that the tetracarboxylic acid dianhydrides used in Synthetic Example 1 were changed to 35.7 g (0.17 mole) of 1,2,3,4-cyclopentanetetracarboxylic acid dianhydride and 5.9 g (0.03 mole) of 1,2,3,4-cyclobutanetetracarboxylic acid dianhydride. The polymer (I-5) was subjected to the same imidization reaction as in Synthesis Example 2 to obtain 26.3 g of a polymer (II-5) having an intrinsic viscosity of 0.99 dl/g.

SYNTHESIS EXAMPLE 7

A polymer (I-6) was obtained in the same manner as in Synthesis Example 1 except that the tetracarboxylic acid dianhydrides used in Synthetic Example 1 were changed to 36.0 g (0.17 mole) of 2,3,4,5-tetrahydrofurantetracarboxylic acid dianhydride and 5.9 g (0.03 mole) of 1,2,3,4-cyclobutanetetracarboxylic acid dianhydride. The polymer (I-6) was subjected to the same imidization reaction as in Synthesis Example 2 to obtain 26.7 g of a polymer (II-6) having an intrinsic viscosity of 1.08 dl/g.

SYNTHESIS EXAMPLE 8

A polymer (I-7) was obtained in the same manner as in Synthesis Example 1 except that the tetracarboxylic acid dianhydrides used in Synthetic Example 1 were changed to 33.7 g (0.17 mole) of butanetetracarboxylic acid dianhydride and 5.9 g (0.03 mole) of 1,2,3,4-cyclobutanetetracarboxylic acid dianhydride. The polymer (I-7) was subjected to the same imidization reaction as in Synthesis Example 2 to obtain 26.4 g of a polymer (II-7) having an intrinsic viscosity of 1.01 dl/g.

SYNTHESIS EXAMPLE 9

A polymer (I-8) was obtained in the same manner as in Synthesis Example 1 except that the tetracarboxylic acid dianhydrides used in Synthetic Example 1 were changed to 44.9 g (0.17 mole) of 5-(2,5-dioxotetrahydrofural)-3-methyl-3-cyclohexene-1,2-dicarboxylic acid dianhydride and 5.9 g (0.03 mole) of 1,2,3,4-cyclobutanetetracarboxylic acid dianhydride. The polymer (I-8) was subjected to the same imidization reaction as in Synthesis Example 2 to obtain 25.7 g of a polymer (II-8) having an intrinsic viscosity of 1.14 dl/g.

SYNTHESIS EXAMPLE 10

A polymer (I-9) was obtained in the same manner as in Synthesis Example 1 except that the tetracarboxylic acid dianhydrides used in Synthetic Example 1 were changed to 42.2 g (0.17 mole) of bicyclo[2.2.2]-octo-7-ene-2,3,5,6-tetracarboxylic acid dianhydride and 5.9 g (0.03 mole) of 1,2,3,4-cyclobutanetetracarboxylic acid dianhydride. The polymer (I-9) was subjected to the same imidization reaction as in Synthesis Example 2 to obtain 26.0 g of a polymer (II-9) having an intrinsic viscosity of 1.04 dl/g.

SYNTHESIS EXAMPLE 11

A polymer (I-10) was obtained in the same manner as in Synthesis Example 1 except that the tetracarboxylic acid dianhydrides used in Synthetic Example 1 were changed to 51.0 g (0.17 mole) of 1,3,3a,4,5,9b-hexahydro-5-(tetrahydro-2,5-dioxo-3-furanyl)-naphtho[1,2-c]furan-1,3-dione and 5.9 g (0.03 mole) of 1,2,3,4-cyclobutanetetracarboxylic acid dianhydride. The polymer (I-10) was subjected to the same imidization reaction as in Synthesis Example 2 to obtain 26.0 g of a polymer (II-10) having an intrinsic viscosity of 1.14 dl/g.

SYNTHESIS EXAMPLE 12

A polymer (I-11) was obtained in the same manner as in Synthesis Example 1 except that the tetracarboxylic acid dianhydrides used in Synthetic Example 1 were changed to 53.4 g (0.17 mole) of 1,3,3a,4,5,9b-hexahydro-5-methyl-5-(tetrahydro-2,5-dioxo-3-furanyl)-naphtho[1,2-c]furan-1,3-dione and 5.9 g (0.03 mole) of 1,2,3,4-cyclobutanetetracarboxylic acid dianhydride. The polymer (I-11) was subjected to the same imidization reaction as in Synthesis Example 2 to obtain 27.2 g of a polymer (II-11) having an intrinsic viscosity of 1.02 dl/g.

SYNTHESIS EXAMPLE 13

A polymer (I-12) was obtained in the same manner as in Synthesis Example 1 except that there were used, as tetracarboxylic acid dianhydrides, 53.4 g (0.17 mole) of 1,3,3a,4,5,9b-hexahydro-5-methyl-5-(tetrahydro-2,5-dioxo-3-furanyl)-naph-tho[1,2-c]furan-1,3-dione and 5.9 g (0.03 mole) of 1,2,3,4-cyclobutanetetracarboxylic acid dianhydride and, as diamine compounds, 5.4 g (0.05 mole) of 1,4-phenylenediamine, 25.8 g (0.13 mole) of 4,4'-diaminodiphenylmethane and 10.4 g (0.02 mole) of the compound represented by the formula (15). The polymer (I-12) was subjected to the same imidization reaction as in Synthesis Example 2 to obtain 28.2 g of a polymer (II-12) having an intrinsic viscosity of 0.74 dl/g.

SYNTHESIS EXAMPLE 14

A polymer (I-13) was obtained in the same manner as in Synthesis Example 13 except that the amounts of 1,4-phenylenediamine, 4,4'-diaminodiphenylmethane and the compound represented by the formula (15) were changed to 2.2 g (0.02 mole), 31.7 g (0.16 mole) and 10.4 g (0.02 mole), respectively. The polymer (I-13) was subjected to the same imidization reaction as in Synthesis Example 2 to obtain 27.3 g of a polymer (II-13) having an intrinsic viscosity of 0.76 dl/g.

SYNTHESIS EXAMPLE 15

A polymer (I-14) was obtained in the same manner as in Synthesis Example 13 except that the amounts of 1,4-phenylenediamine, 4,4'-diaminodiphenylmethane and the compound represented by the formula (15) were changed to 14.1 g (0.13 mole), 9.9 g (0.05 mole) and 10.4 g (0.02 mole), respectively. The polymer (I-14) was subjected to the same imidization reaction as in Synthesis Example 2 to obtain 27.2 g of a polymer (II-14) having an intrinsic viscosity of 0.75 dl/g.

SYNTHESIS EXAMPLE 16

A polymer (I-15) was obtained in the same manner as in Synthesis Example 13 except that the amounts of 1,4-phenylenediamine, 4,4'-diaminodiphenylmethane and the compound represented by the formula (15) were changed to 5.4 g (0.05 mole), 29.3 g (0.148 mole) and 1.0 g (0.002 mole), respectively. The polymer (I-15) was subjected to the same imidization reaction as in Synthesis Example 2 to obtain 27.0 g of a polymer (II-15) having an intrinsic viscosity of 0.74 dl/g.

SYNTHESIS EXAMPLE 17

A polymer (I-16) was obtained in the same manner as in Synthesis Example 13 except that the amounts of 1,4-phenylenediamine, 4,4'-diaminodiphenylmethane and the compound represented by the formula (15) were changed to 5.4 g (0.05 mole), 19.8 g (0.10 mole) and 26.2 g (0.05 mole), respectively. The polymer (I-16) was subjected to the same imidization reaction as in Synthesis Example 2 to obtain 25.7 g of a polymer (II-16) having an intrinsic viscosity of 0.59 dl/g.

COMPARATIVE SYNTHESIS EXAMPLE 1

A polymer (I-17) was obtained in the same manner as in Synthesis Example 1 except that the tetracarboxylic acid dianhydrides used in Synthesis Example 1 were changed to 44.8 g (0.20 mole) of 2,3,5-tricarboxycyclopentylacetic acid dianhydride. The polymer (I-17) was subjected to the same imidization reaction as in Synthesis Example 2 to obtain 27.2 g of a polymer (II-17) having an intrinsic viscosity of 1.34 dl/g.

COMPARATIVE SYNTHESIS EXAMPLE 2

A polymer (I-18) was obtained in the same manner as in Synthesis Example 1 except that the tetracarboxylic acid dianhydrides used in Synthesis Example 1 were changed to 29.1 g (0.13 mole) of 2,3,5-tricarboxycyclopentylacetic acid anhydride and 13.7 g (0.07 mole) of 1,2,3,4-cyclobutanetetracarboxylic acid dianhydride. The polymer (I-18) was subjected to the same imidization reaction as in Synthesis Example 2, but a precipitate (a polymer II-18) appeared during the imidization.

COMPARATIVE SYNTHESIS EXAMPLE 3

84.2 g of a polymer (I-19) having an intrinsic viscosity of 1.68 dl/g was obtained in the same manner as in Synthesis Example 1 except that the tetracarboxylic acid dianhydrides used in Synthesis Example 1 were changed to 64.4 g (0.20 mole) of benzophenonetetracarboxylic acid dianhydride.

EXAMPLE 1

(1) Preparation of liquid crystal-aligning agent

The polymer (I-1) obtained in Synthesis Example 1 was dissolved in N-methyl-2-pyrrolidone to form a solution having a solid content of 4% by weight. The solution was filtered through a filter having a pore diameter of 1 µm, to prepare a liquid crystal-aligning agent.

(2) Production of liquid crystal display device (a) The above-prepared liquid crystal-aligning agent was coated on the transparent electroconductive film (an ITO film) formed on one side of a glass substrate, by the use of a printer used for coating of liquid crystal-aligning agent. The coated agent was dried at 180° C. for 1 hour to form a coating film having an as-dried thickness of 0.05 µm.

(b) The surface of the above-formed coating film was subjected to a rubbing treatment using a rubbing machine having a roll covered with a rayon cloth, whereby the coating film was provided with an alignability for liquid crystal molecules and a liquid crystal-aligning film was produced. Herein, the rubbing treatment conditions were number of roll revolutions=500 rpm, movement speed of stage=1 cm/sec, and pile contact lenght=0.7 mm. The liquid crystal-aligning film had no rubbing scars.

(c) Two substrates each having a liquid crystal-aligning film formed thereon were prepared as above. The periphery of each substrate was coated with an epoxy resin containing spherical aluminum oxide of 17 µm in diameter, by screen printing. Then, the two substrates were placed in parallel via a gap such that the respective liquid crystal-aligning films faced each other and their rubbing directions became perpendicular to each other. Thereafter, the two substrates were allowed to abut on each other at the peripheries and press-bonded to cure the adhesive.

(d) A nematic liquid crystal (MLC-2003, a product of Merck Japan) was charged into the cell gap between the substrates from a liquid crystal filling hole. Then, the filling hole was sealed with an epoxy adhesive to form a liquid crystal cell. On the outer surface of the liquid crystal cell, i.e. the other sides of two substrates constituting the liquid crystal cell were laminated polarizing plates such that the polarization direction of each polarizing plate coincided with the rubbing direction of the liquid crystal-aligning film formed on one side of each substrate, whereby a liquid crystal display device was produced.

When the liquid crystal display device was subjected to a voltage ON-OFF operation described in the above alignability test, no abnormal domain was detected in the liquid crystal cell and the device had an excellent alignability. Further, the device had a voltage holding ratio of as high as 94.5% at 80° C.

EXAMPLES 2 TO 17

Using the polymers (II-1) to (II-16) obtained in Synthesis Examples 2 to 17, liquid crystal-aligning agents of the present invention were prepared in accordance with the recipes shown in Table 1, in the same manner as in Example 1 (1). Using the liquid crystal-aligning agents, liquid crystal display devices were produced in the same manner as in Example 1 (2). In each Example, there were examined the generation of rubbing scars in liquid crystal-aligning film, the alignability for liquid crystal, and the voltage holding ratio of liquid crystal. The results are shown in Table 1 together with those of Example 1.

COMPARATIVE EXAMPLE 1

Using the polymer (II-17) obtained in Comparative Synthesis Example 1, a liquid crystal-aligning agent for comparison was prepared in the same manner as in Example 1 (1). Using this liquid crystal-aligning agent, a liquid crystal display device was produced in the same manner as in Example 1 (2) and evaluated. The results are shown in Table 1.

COMPARATIVE EXAMPLE 2

Using the polymer (II-18) obtained in Comparative Synthesis Example 2, a liquid crystal-aligning agent for comparison was prepared in the same manner as in Example 1 (1). This agent was very inferior in filtrability and the filtrate obtained was cloudy. Using this liquid crystal-aligning agent, a liquid crystal display device was produced in the same manner as in Example 1 (2). The device showed inferior display presumably caused by the formation of film of nonuniform thickness during printing. The results are shown in Table 1.

COMPARATIVE EXAMPLE 3

Using the polymer (I-19) obtained in Comparative Synthesis Example 3, a liquid crystal-aligning agent for comparison was prepared in the same manner as in Example 1 (1). Using this liquid crystal-aligning agent, a liquid crystal display device was produced in the same manner as in Example 1 (2) and evaluated. The results are shown in Table 1.

TABLE 1

|  | Polymer | Alignability for liquid crystal | Voltage holding ratio (%, 80° C.) | Rubbing scars |
| --- | --- | --- | --- | --- |
| Example 1 | I-1 | Good | 94.5 | Good |
| Example 2 | II-1 | Good | 94.7 | Good |
| Example 3 | II-2 | Good | 94.0 | Good |
| Example 4 | II-3 | Good | 94.3 | Good |
| Example 5 | II-4 | Good | 94.3 | Good |
| Example 6 | II-5 | Good | 93.8 | Good |
| Example 7 | II-6 | Good | 93.5 | Good |
| Example 8 | II-7 | Good | 93.8 | Good |
| Example 9 | II-8 | Good | 93.9 | Good |
| Example 10 | II-9 | Good | 94.0 | Good |
| Example 11 | II-10 | Good | 94.7 | Good |
| Example 12 | II-11 | Good | 94.2 | Good |
| Example 13 | II-12 | Good | 95.2 | Good |
| Example 14 | II-13 | Good | 93.9 | Good |
| Example 15 | II-14 | Good | 95.3 | Good |
| Example 16 | II-15 | Good | 94.5 | Good |
| Example 17 | II-16 | Good | 94.3 | Good |
| Comparative Example 1 | II-17 | Good | 94.5 | Scars |
| Comparative Example 2 | II-18 | Poor | 93.0 | Good |
| Comparative Example 3 | I-19 | Good | 85.3 | Good |

According to the present invention, there can be obtained a liquid crystal-aligning agent which gives a liquid crystal display device low in rubbing scars, generated in the rubbing treatment, of liquid crystal-aligning film and excellent in alignability for liquid crystal and voltage holding ratio.

When the liquid crystal-aligning film formed with the liquid crystal-aligning agent of the present invention is subjected to (1) a treatment in which the film is irradiated with ultraviolet rays to change the pretilt angle [the treatment is described in Japanese Patent Application Kokai (Laid-Open) Nos. 222366/1994 and 281937/1994] or (2) a treatment in which a resist is coated on part of the film to change the rubbing direction of the film [the treatment is described in Japanese Patent Application Kokai (Laid-Open) No. 107544/1993], the resulting liquid crystal display device can have improved viewing angle characteristics.

The liquid crystal display device having a liquid crystal-aligning film formed with the present liquid crystal-aligning agent can be suitably used, by proper selection of the liquid crystal used in the device, also as a STN (super twisted nematic), SH (super homeotropic), ferroelectric or antiferroelectric liquid crystal display device.

Further, the liquid crystal display device having a liquid crystal-aligning film formed with the present liquid crystal-aligning agent is superior in alignability for liquid crystal and reliability and can be effectively used in various apparatuses, for example, display devices such as desk calculator, wrist watch, table clock, digital display panel, word processor, personal computer, liquid crystal TV and the like.

What is claimed is:

1. A liquid crystal-aligning agent comprising at least one of a polyamic acid (hereinafter referred to as "polymer I") obtained by reacting (A) a tetracarboxylic acid dianhydride consisting of 70 to 98 mole % of (A-1) a dianhydride of a tetracarboxylic acid selected from the group consisting of the compounds represented by the following formula (1) to (7):

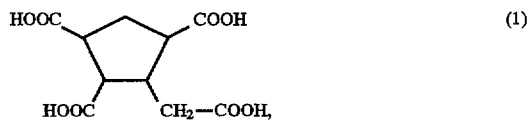

(1)

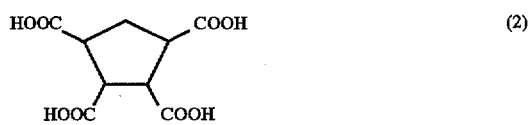

(2)

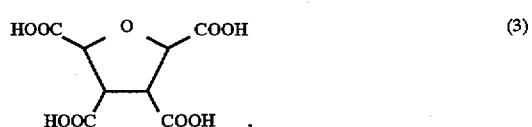

(3)

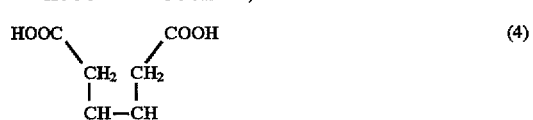

(4)

(5)

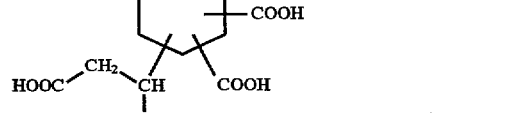

(6)

and

-continued

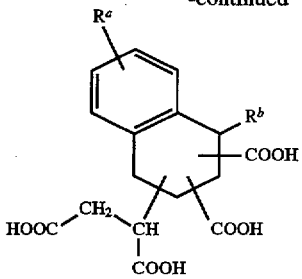

(7)

wherein $R^a$ and $R^b$ in the formula (7) are each independently a hydrogen atom, a methyl group or an ethyl group, and 2 to 30 mole % of (A-2) a dianhydride of a cyclobutanetetracarboxylic acid represented by the following formula (8):

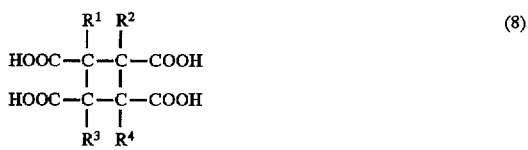

(8)

wherein $R^1$ to $R^4$ are each independently a hydrogen atom, a halogen atom or an alkyl group of 1 to 3 carbon atoms, and (B) a diamine compound represented by the following formula (9):

(9)

wherein $R^5$ is a divalent organic group, and a polymer (hereinafter referred to as "polymer II") obtained by imidizing the polymer I.

2. A liquid crystal-aligning agent according to claim 1, wherein the dianhydride of a tetracarboxylic acid selected from the group consisting of the compounds represented by the formula (1) to (7) is at least one compound selected from the group consisting of 2,3,5-tricarboxycyclopentylacetic acid dianhydride, butanetetracarboxylic acid dianhydride, 1,3,3a,4,5,9b-hexahydro-5-(tetrahydro-2,5-dioxo-3-furanyl)-naphtho-[1,2-c]-furan-1,3-dione, 1,3,3a,4,5,9b-hexahydro-5-methyl-5-(tetrahydro-2,5-dioxo-3-furanyl)-naphtho[1,2-c]-furan-1,3-dione1, 1,3,3a,4,5,9b-hexahydro-5-ethyl-5-(tetrahydro-2,5-dioxo-3-furanyl)-naphtho[1,2-c]-furan-1,3-dione, 1,3,3a,4,5,9b-hexahydro-7-methyl-5-(tetrahydro-2,5-dioxo-3-furanyl)-naphtho[1,2-c]-furan-1,3-dione. 1,3,3a,4,5,9b-hexahydro-7-ethyl-5-(tetrahydro- 2,5-dioxo-3-furanyl)-naphtho[1,2-c]-furan-1,3-dione, 1,3,3a,4,5,9b-hexahydro-8-methyl-5-(tetrahydro-2,5-dioxo-3-furanyl)-naphtho-[1,2-c]-furan-1,3-dione, 1,3,3a,4,5,9b-hexahydro-8-ethyl-5-(tetrahydro-2,5-dioxo-3-furanyl)-naphtho[1,2-c]-furan-1,3-dione and 1,3,3a,4,5,9b-hexahydro-5,8-dimethyl-5-(tetrahydro-2,5-dioxo-3.-furanyl)-naphtho[1,2-c]-furan-1,3-dione.

3. A liquid crystal-aligning agent according to claim 1, wherein the dianhydride of a cyclobutanetetracarboxylic acid represented by the formula (8) is at least one compound selected from the group consisting of 1,2,3,4-cyclobutanetetracarboxylic acid dianhydride, 1,3-dimethyl-1,2,3,4-cyclobutanetetracarboxylic acid dianhydride, 1,2,3, 4-tetramethyl-1,2,3,4-cyclobutanetetracarboxylic acid dianhydride, 1,3-diethyl-1,2,3,4-cyclobutanetetracarboxylic acid dianhydride, 1,2,3,4-tetraethyl-1,2,3,4-cyclobutanetetracarboxylic acid dianhydride, 1,2,3,4-tetrachloro-1,2,3,4-cyclobutanetetracarboxylic acid dianhydride and 1,2,3,4-tetrafluorocyclobutanetetracarboxylic acid dianhydride.

4. A liquid crystal-aligning agent according to claim 1, wherein the tetracarboxylic acid dianhydride (A) consists of 80 to 98 mole % of a dianhydride of a tetracarboxylic acid represented by the formula (1) to (7) and 2 to 20 mole % of a dianhydride of a cyclobutanetetracarboxylic acid represented by the formula (8).

5. A liquid crystal-aligning agent according to claim 1, wherein the diamine-compound (B) is at least one diamine selected from the group consisting of 1,4-phenylenediamine, 4,4'-diaminodiphenylmethane, 4,4'-diaminodiphenyl ether, 2,2-bis[4-(4-aminophenoxy)-phenyl]propane, 9,9-bis(4-aminophenyl)fluorene, 2,2-bis[4-(4-aminophenoxy)phenyl] hexafluoropropane, 2,2-bis( 4-aminophenyl) hexafluoropropane, 4,4'-(1,4-phenylenediisopropylidene) bisaniline and 4,4'-(1,3-phenylenediisopropylidene) bisaniline.

6. A liquid crystal-aligning agent according to claim 1, wherein the diamine compound (B) is a combination of (B-1) a phenylenediamine compound represented by the following formula (10):

(10)

wherein $R^6$ is a halogen atom, an alkyl group or an alkoxyl group; and a is an integer of 0 to 4, (B-2) a diamine compound represented by the following formula (11):

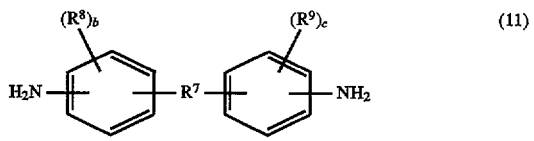

(11)

wherein $R^7$ is —$CH_2$—, —O—, —S—, a group represented by the following formula (i):

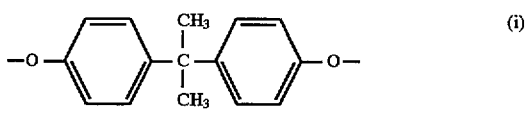

(i)

or a group represented by the following formula (ii):

(ii)

$R^8$ and $R^9$ are each independently a halogen atom or an alkyl group; and b and c are each independently an integer of 0 to 4, and (B-3) a diamine compound having a steroidal skeleton, represented by the following formula (12):

(12)

wherein $R^{10}$ is a divalent organic group having a steroidal skeleton.

7. A liquid crystal-aligning agent according to claim 6, wherein the proportions of the phenylenediamine compound (B-1) represented by the formula (10), the diamine compound (B-2) represented by the formula (11) and the diamine compound (B-3) represented by the formula (12) are 10 to 70 mole %, 30 to 80 mole % and 1 to 25 mole %, respectively, based on the total moles of the total diamine compounds (B-1), (B-2) and (B-3).

8. A liquid crystal-aligning agent according to claim 7, wherein the proportion of the phenylenediamine compound (B-1) represented by the formula (10) is 10 to 50 mole % based on the total moles of the total diamine compounds (B-1), (B-2) and (B-3).

9. A liquid crystal-aligning agent according to claim 7, wherein the proportion of the diamine compound (B-2) represented by the formula (11) is 40 to 80 mole % based on the total moles of the total diamine compounds (B-1), (B-2) and (B-3).

10. A liquid crystal-aligning agent according to claim 7, wherein the proportion of the diamine compound (B-3) represented by the formula (12) is 3 to 20 mole % based on the total moles of the total diamine compounds (B-1), (B-2) and (B-3).

* * * * *

UNITED STATES PATENT AND TRADEMARK OFFICE
CERTIFICATE OF CORRECTION

PATENT NO. : 5,698,135
DATED : December 16, 1997
INVENTOR(S) : Michinori NISHIKAWA et al.

It is certified that error appears in the above-identified patent and that said Letters Patent is hereby corrected as shown below:

On the title page, Item [30], The Foreign Application Data should read:

-- Dec. 16, 1994    [JP]    Japan.......... 6-334243 --

Signed and Sealed this

Tenth Day of February, 1998

Attest:

BRUCE LEHMAN

*Attesting Officer*    *Commissioner of Patents and Trademarks*